United States Patent

[11] 3,581,785

| [72] | Inventor | Albert Neumeier |
| | | Milwaukie, Oreg. |
| [21] | Appl. No. | 296,521 |
| [22] | Filed | July 22, 1963 |
| [45] | Patented | June 1, 1971 |
| [73] | Assignee | Omark Industries, Inc. |
| | | Portland, Oreg. |

[54] TOP SHARPENING CUTTER LINK FOR SAW CHAIN
4 Claims, 11 Drawing Figs.

[52] U.S. Cl. .................................. 143/135, 143/32
[51] Int. Cl. .................................. B27b 33/14
[50] Field of Search .................................. 143/135, 135—7, 135—8, 32, 32—13

[56] References Cited
UNITED STATES PATENTS

| 2,832,180 | 4/1958 | Carlton | 143/135X |
| 2,976,900 | 3/1961 | Mills | 143/135 |
| 3,040,602 | 6/1962 | Carlton | 143/32A |
| 2,508,784 | 5/1950 | Cox | 143/135—7 |
| 2,651,336 | 9/1953 | Warren | 143/135 |
| 3,189,064 | 6/1965 | Frederickson | 143/135 |

Primary Examiner—Donald R. Schran
Attorney—Buckhorn, Blore, Klarquist & Sparkman CLAIM: 1. In a top sharpening saw chain link, the link being solely a one-piece, continuous, formed sheet of metal and including: a body plate having a pair of pivot portions and also having a forward end, a rear end and an outer edge portion, an elongated top plate, a shank connecting one edge portion of the top plate to the outer edge portion of the body plate, the entire top plate being to the rear of the midpoint of a line joining the pivot portions, the top plate being steeply inclined relative to said line and extending longitudinally rearwardly and inwardly relative to the body plate and at least the outer portion of the top plate lying in a plane tilted to a predetermined extent from the normal to the body plate, the forward, outer end of the top plate comprising an arcuate, abradable surface intersecting the forwardly and inwardly facing face of the top plate to form an acute cutting edge therewith which extends laterally and rearwardly relative to the body plate from the end of the cutting edge nearer to the shank and lies substantially in a plane normal to the body plate, the arcuate, abradable surface of the top plate being the outermost portion of the link and also intersecting the outer face of the top plate rearwardly of the cutting edge, the arcuate abradable surface having as the center thereof, when the link is advanced by a drive sprocket of a chain saw, the axis of rotation of the sprocket.

PATENTED JUN 1 1971 3,581,785
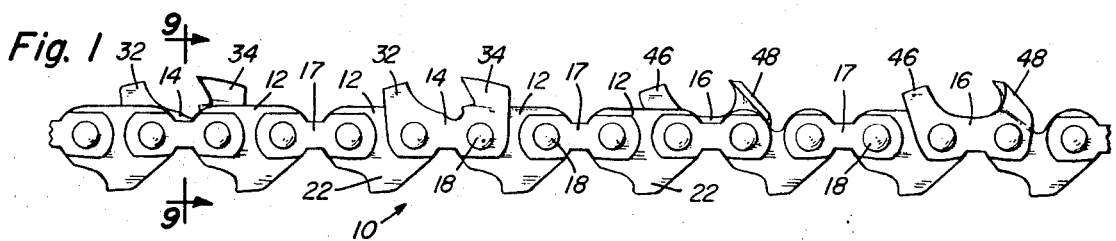
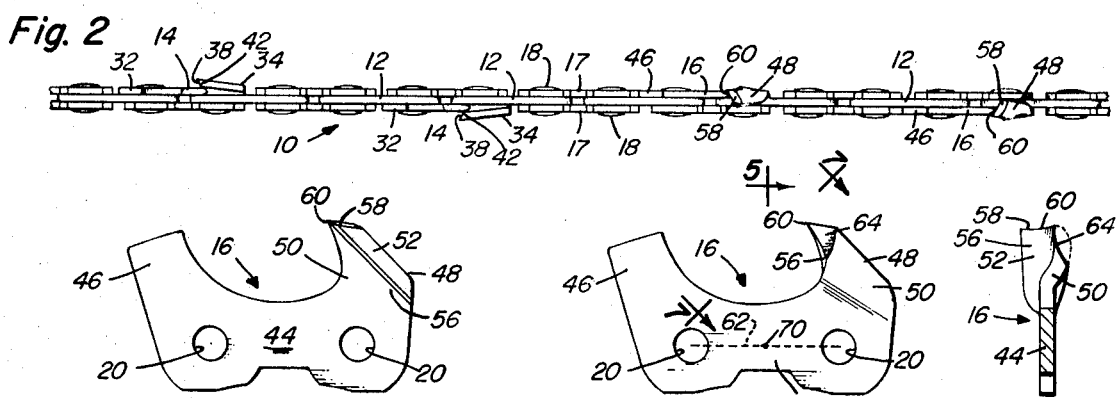
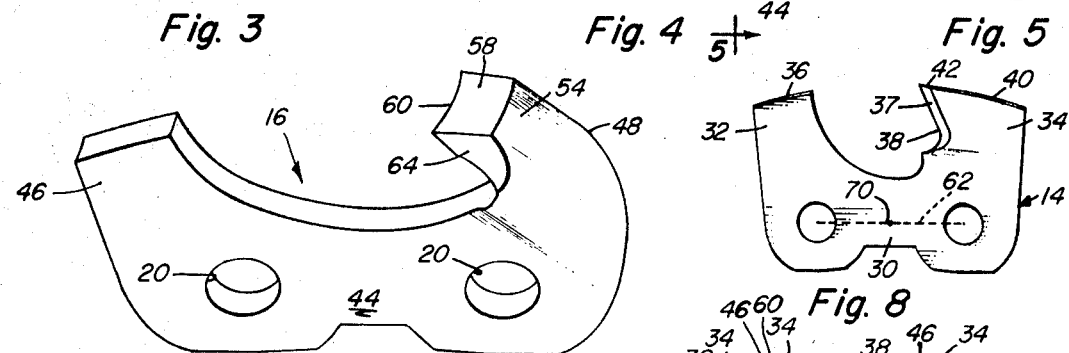
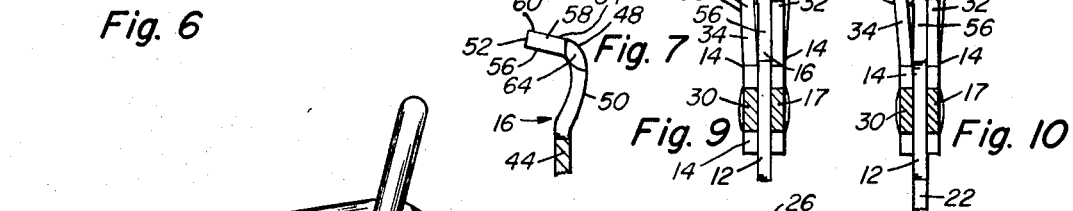
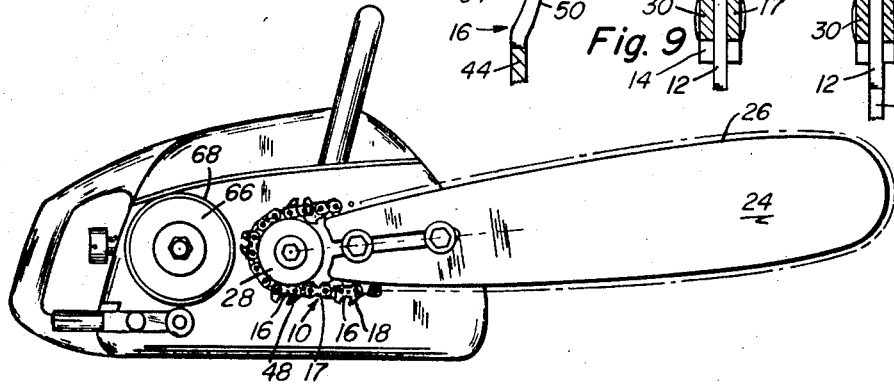
ALBERT NEUMEIER
INVENTOR.
BY
BUCKHORN, BLORE, KLARQUIST & SPARKMAN
ATTORNEYS

TOP SHARPENING CUTTER LINK FOR SAW CHAIN

SELF SHARPENING CUTTER LINK FOR SAW CHAIN

The present invention relates to improvements in saw chain and more particularly to an improved top sharpening cutter link for a saw chain.

Saw chains which can be sharpened by means of a sharpening device attached to the saw while the chain is on the saw and being driven by the chain saw motor have been previously proposed. Such proposed top sharpening saw chains, however, have been of the so-called "scratcher" type having a large number of different configurations of narrow cutting teeth including right and left kerf sidewall slitters and kerf bottom rakers with cutting edges positioned inwardly of those of the sidewall slitters, or have been of the type having built up cutter elements including laterally extending bits of high speed steel or the like brazed or welded to the cutter links. Both types of chain are costly to manufacture.

Even though the saw chains above discussed are top sharpening so that they can be sharpened automatically, most of the saw chains in use at the present time are of the so-called "chipper" and "chisel" types of saw chain, each of which is characterized by identical but allochiral cutter links which incorporate both kerf sidewall and kerf bottom wall cutting edges in a single L or hook-shaped cutting tooth. These types of saw chain have been extremely popular with woodsmen because of their smooth and rapid cutting action in normal cutting operations, and their relative ease of maintenance, although such chain cannot be sharpened while in motion on a chain saw.

In accordance with the present invention, an improved saw chain is provided including a top sharpening cutter link having a hook-shaped cutting element with a laterally extending, chisel cutting leading edge which can be sharpened while the chain is in motion on a chain saw. A chisel cutting edge is provided at the forward end of a steeply forwardly and outwardly inclined laterally extending top plate or toe plate on the cutting element. Thus the forward end of the top plate is beveled to provide an outer surface extending rearwardly and inwardly from the forward to the rearward faces of the top plate to produce a chisel cutting edge at the intersection of the outer surface and forward face of the top plate. This outer surface is positioned rearwardly of the midpoint of a line extending between the axes of the pivotal connections at the ends of the cutter link so that the cutting edge may readily be sharpened by bringing the outwardly facing beveled outer surface of the forward end of the top plate into contact with an external sharpening element while the cutter link is traveling around the sprocket of a chain saw.

It is, therefore, an object of the present invention to provide an improved cutter link for a saw chain on which a laterally extending chisel cutting edge of greater length than the thickness of the link body may be sharpened by a sharpening device attached to a chain saw while the chain of which the cutter link is a part is in motion on the chain saw.

Another object of the present invention is to provide an improved, top sharpening cutter link on which a laterally extending and forwardly and outwardly inclined top plate has an outwardly facing and rearwardly and inwardly inclined surface on its forward and defining at its intersection with the forward face of the top plate a chisel cutting edge.

Another object of the invention is to provide an improved top sharpening saw chain in which right and left kerf sidewall slitter links are combined with right and left hand kerf bottom cutter links, each of which has a laterally extending chisel cutting edge at the forward end of a forwardly and outwardly inclined top plate, in a manner which enables cutting edges on the slitter links as well as the chisel cutting edges to be sharpened while the chain is in motion on a chain saw.

The foregoing and other objects and advantages will be readily apparent from the following description made with reference to the accompanying drawings in which like numerals refer to like parts throughout, while the novel features of the invention will be pointed out more specifically in the appended claims.

In the drawings:

FIG. 1 is a side elevational view of a length of saw chain in accordance with the present invention;

FIG. 2 is a tp plan view of the saw chain of FIG. 1;

FIG. 3 is a side elevational view on an enlarged scale of a right kerf bottom cutter link of the saw chain of FIG. 1;

FIG. 4 is a side elevational view on the same scale as FIG. 3 of a left kerf bottom cutter link of the saw chain of FIG. 1;

FIG. 5 is a sectional view taken along the line 5–5 of FIG. 4;

FIG. 6 is a perspective view on a further enlarged scale of the cutter link of FIG. 4;

FIG. 7 is a fragmentary view taken along the line 7–7 of FIG. 4;

FIG. 8 is a side elevational view on the same scale as FIG. 3 of a right sidewall slitter of the saw chain of FIG. 1;

FIG. 9 is a vertical sectional view on an enlarged scale taken along the line 9–9 of FIG. 1;

FIG. 10 is a view similar to FIG. 9 but showing a slightly modified saw chain; and FIG. 11 is a side elevational view showing the saw chain of FIG. 1 in position on a chain saw having a chain sharpening device attached thereto.

With reference to the drawings, FIG. 1 illustrates a saw chain 10 having a plurality of longitudinally spaced apart center drive links 12 pivotally joined together by side links, including allochiral right and left kerf sidewall slitter links 14, allochiral right and left kerf bottom wall cutter links 16 and side straps 17. Pivot pins or rivets 18 extend through pairs of rivet holes 20 in the side and center links to provide pivotal connections between the various links.

Each of the center links 12 has a downwardly extending drive lug or root portion 22 which travels in a groove in the peripheral edge of a saw bar 24, shown in FIG. 11, while the lower or bar confronting edges of the side links slide along the peripheral edge surfaces 26 of the saw bar on each side of the groove. A drive sprocket 28 positioned adjacent the rear end of the saw bar 24 has sprocket teeth which engage the trailing edges of the root portions 22 of the center links to drive the chain about the saw bar.

The side straps 17 are all of identical configuration, and serve in conjunction with the slitter and cutter links as connectors between the center links.

Each of the sidewall slitters 14 are identical except for being alternately of right and left hand configuration and, accordingly, only one such slitter need be described in further detail. With reference to FIG. 8, showing a right side slitter 14, each slitter includes a slitter link body 30, an integral depth gauge 32 extending outwardly from the link body adjacent the forward end of the link body and an integral slitter cutter element or tooth 34 of the same thickness as the body extending outwardly in the same direction as the depth gauge from the link body adjacent the rear end of the link body. The depth gauge 32 has a convex arcuate kerf bottom-engaging surface 36 on its outer end which curves outwardly of the link body from the front to the rear edge thereof.

The forward end of the slitter cutter element 34 is displaced laterally of the link body 30 and is inclined outwardly and forwardly from the link body. This forward end is beveled rearwardly from the side of the cutter element remote from the center of the chain to provide a beveled surface 37 and define a sharp side cutting edge 38 having a positive rake angle and side clearance or relief rearwardly of the cutting edge. The top or outermost edge surface 40 of the slitter cutter tooth is an arcuate continuation of the surface 36 of the depth gauge and curves outwardly and forwardly from the rearward end to the forward end of the slitter cutter element. The surface 40 intersects the beveled surface 37 to define a short laterally extending cutting edge 42 which in turn intersects the cutting edge 38 to form a sharp outer cutting corner. As shown most clearly in FIGS. 2 and 9 the outer portion of the cutting edge 38 of the slitter element 34 is offset laterally from the median plane of the chain and from the link body so that the width of the kerf cut by the saw chain will be greater than the thickness of the saw bar and any other portion of the chain, thereby preventing the saw bar and chain from binding in the kerf.

With reference particularly to FIGS. 3 through 7, each of the cutter links 16 includes a flat link body 44, an integral depth gauge 46 substantially identical in shape to the slitter depth gauge 32 previously described, and an integral hook-shaped cutting element 48 extending outwardly from the rear end of the link body in the same general direction as the depth gauge 46. Although all of the cutter links 16 are identical except for being alternately of right- and left-hand configuration, reference will be made to both left and right cutter links for convenience in describing individual features. The cutting element 48 includes a curved side plate or shank portion 50 offset laterally with respect to the link body 44 in a direction away from the median plane of the chain of which the link forms a part. The shank extends outwardly from the link body and the metal at the portion of the shank outermost from the body is bent back over the link body to form a substantially flat toe or top plate 52, which extends laterally of the body toward and across the median plane of the chain so as to terminate on the opposite side of the median plane of the chain with respect to the body portion 44 of the cutter link. Thus, as shown in the drawings, the cutter links 16 as well as the cutter links 14 are each a one-piece, continuous, formed sheet of metal.

In a direction longitudinally of the link body and chain, the top plate is inclined forwardly and outwardly from the link body 44 at a steep angle from the rearward end to the forward end thereof, for example, at an angle of 40° to 50° to a line joining the axes of the pivotal connections or rivet holes of the cutter link. The top plate includes substantially flat, inclined rearward and forward faces 54 and 56, respectively, and an outer surface 58 adjacent the forward end of the top plate which is beveled rearwardly and inwardly from the forward face 56 to the rearward face 54 to provide a chisel cutting edge 60 at the intersection of the outer surface 58 and the forward face 56. This chisel cutting edge extends laterally of the cutter link body across the forward and outer end of the top plate. The cutting edge 60 is also inclined rearwardly and laterally from the side of the plate nearest the body portion 44 of the link as shown in FIG. 2 to provide a slicing, cutting action in wood. Referring to FIG. 7 it will be noted that the top plate extends from the shank 50 at an angle somewhat greater than a right angle with respect to the median plane of the body 44 of the link to provide the hook-shaped cutter referred to above. Thus the angle formed by the intersection of the top plate and median plane of the link body is an obtuse angle preferably of the order of 100° to 115°, the optimum being about 105°. Also the outer surface 58 of the top plate is ground so as to extend generally at a right angle with respect to the median plane of the link body 44 as shown in FIG. 5. This produces the rearward and lateral inclination of the cutting edge 60 referred to above.

The inclination of the top plate 52 with respect to the longitudinal axis of the link body, i.e., to a line 62 joining the centers of the rivet holes 20, is such that a cutting edge is provided at the intersection of the forward face 56 and outer surface 58 of the top plate and this cutting edge 60 is positioned outwardly and forwardly of the remaining portions of the top plate. As stated above, the inclination of the top plate will be of the order of about 40° to 50° as illustrated but it may vary depending upon the cutting angle and clearance angle desired for the chisel cutting edge. From FIGS. 4, 5, 6 and 7 it will be noted that the corner normally formed at the intersection of the forward edges of the shank and top plate, as shown in FIG. 5 in dotted lines, is ground away to provide a cutout portion 64, since a cutting corner and shank cutting edge is unnecessary in view of the provision of the side slitters 14. The outer surface 58 on the cutter element 48 is an arcuate continuation of the outer end surface of the depth gauge 46 and has its forward edge 60 positioned rearwardly of the midpoint 70 of the line 62 a lesser distance than the rearward edge 72 of the outer surface of the depth gauge 46 is positioned forwardly of the midpoint 70 as described more in detail below.

From FIG. 2 and it will be observed that the cutting edges 60 of a right cutter link 16 need only extend laterally to the right from the median plane of the chain to a position approximately coinciding with the laterally innermost terminus of the lateral cutting edges 42 of a right side slitter link 14 and that a similar condition exists for the left cutter link 16 and left slitter link 14. Various arrangements of side slitter links and bottom cutter links in a saw chain may be used for cutting wood but a preferred arrangement, shown in FIGS. 1 and 2, includes a right side slitter link followed by a left side slitter link, then a right bottom cutter link followed by a left bottom cutter link with this order of links then repeating.

An advantage of the chisel cutting edges 60 of the cutter links 16 is that they can be sharpened by a sharpening device attached to a chain saw, as shown in FIG. 11, while the saw chain is being driven about the saw bar 24. These sharpening devices are known in the art and several are disclosed in greater detail in, for example, U.S. Pat. No. 3,040,602. The sharpening device shown in FIG. 11 includes a sharpening wheel 66 mounted on an auxiliary drive shaft of the chain saw rearwardly of and adjacent the drive sprocket 28 and saw bar 24 for rotation in a direction opposite the clockwise direction of rotation of the sprocket 28. The sharpening wheel has a peripheral sharpening surface 68, and the wheel is positioned such that the median plane of the wheel and the sharpening surface 68 coincides with the median plane of the chain 10, saw bar 24 and drive sprocket 28. The sharpening wheel is movable forwardly from an inoperative position shown to an operative position where the top or outer surfaces of both the slitter elements 34 and cutter elements 48 engage the sharpening surface 68 as the cutter links travel upwardly in an arcuate path around the drive sprocket 28. The outer surfaces of the depth gauges also engage the sharpening surface of the wheel. The rearward outer edge 72 of each depth gauge is, however, spaced forwardly of the midpoint 70 of the line 62 joining the centers of the rivet holes 20 a greater distance than the forward cutting edge of the cutter element of the same cutter link is spaced rearwardly of such midpoint. The outer surface of the depth gauge is thus ground to a constant predetermined level below or inwardly from that of the outer surface and cutting edge of the cutter element on the same cutter link.

Because the outer cutting edge of each slitter and bottom cutter link is positioned rearwardly of the centerline of the link body and is sharpened while traveling in an arcuate path as previously described, a relief or clearance with respect to the kerf bottom is provided on each slitter element 34 and on the top plate of each cutter element 48 rearwardly of such cutting edge.

The pitch radius of the drive sprocket 28 is preferably less than the radius of curvature of the nose end of the saw bar, as shown in FIG. 11, so that both kerf bottom depth gauge clearance and kerf bottom cutting edge clearance with respect to the outer cutting edge of each cutter link are provided when cutting occurs at the nose end of the bar. Accordingly, the present chain is particularly well suited for use in "boring" or "stabbing" operations used frequently in felling large timber wherein the nose of the saw bar is pushed into the wood to make a cut. Also extremely fast and smooth cutting operation is provided when the chain is used in the more usual manner of cutting along the peripheral side edge of the saw bar.

As shown most clearly in FIGS. 1 and 9, the outer or top cutting edges of the side slitter links 14 are positioned at a greater height above the bases of their respective links than the cutting edges 60 of the cutter links 16. This relationship is maintained throughout the life of the chain when sharpened on the saw bar by reason of the fact that the cutting edges 60 of the cutter links 16 are positioned a greater distance rearwardly of the midpoints 70 of their respective links than are the outer cutting edges 42 of the slitter links.

Another contributing factor to this difference in height is the fact that the sharpening surface 68 of the wheel 66 is crowned or convexly curved from edge to edge thereof. Thus the cutter elements 48 of the links 16, because they are offset laterally a lesser distance from the median plane of the chain than the slitter cutter elements 34, engage the wheel surface nearer its crown and median plane than do the side slitter elements. Accordingly, the elements 48 are ground to a lower level than the slitter elements 34. The use of a crowned sharpening wheel results in the outer surface 58 of the top plate 52 being ground slightly concave laterally, as shown in FIG. 6, although such surface remains substantially flat.

If desired, however, a sharpening wheel having a laterally extending flat, rather than crowned, sharpening surface may be used to sharpen the same cutter links. In such instance, the outer surfaces of the slitter elements and bottom cutter elements are ground flat and at right angles to the sides of the link bodies as shown in FIG. 10. The outer surface of the bottom cutter elements are ground lower or inwardly with respect to those of the side slitter elements because the forward edges of the side slitter elements 48 are closer to the midpoints of their respective links than the cutter elements 48 as previously explained.

Having illustrated and described a preferred embodiment of the invention, it should be apparent to those skilled in the art that the invention permits of modification in arrangement and detail. I claim as my invention all such modifications as come within the true spirit and scope of the appended claims.

1. In a top sharpening saw chain link,
the link being solely a one-piece, continuous, formed sheet of metal and including:
a body plate having a pair of pivot portions and also having a forward end, a rear end and an outer edge portion,
an elongated top plate, and
a shank connecting one edge portion of the top plate to the outer edge portion of the body plate,
the entire top plate being to the rear of the midpoint of a line joining the pivot portions,
the top plate being steeply inclined relative to said line and extending longitudinally rearwardly and inwardly relative to the body plate and at least the outer portion of the top plate lying in a plane tilted to a predetermined extent from the normal to the body plate,
the forward, outer end of the top plate comprising an arcuate, abradable surface intersecting the forwardly and inwardly facing face of the top plate to form an acute cutting edge therewith which extends laterally and rearwardly relative to the body plate from the end of the cutting edge nearer to the shank and lies substantially in a plane normal to the body plate,
the arcuate, abradable surface of the top plate being the outermost portion of the link and also intersecting the outer face of the top plate rearwardly of the cutting edge,
the arcuate abradable surface having as the center thereof, when the link is advanced by a drive sprocket of a chain saw, the axis of rotation of the sprocket.

2. In a top sharpening saw chain link adapted to be formed completely from a one-piece sheet metal blank,
the link being formed solely from a one-piece, continuous sheet of metal and including:
a body plate having an outer edge portion, a pair of pivot portions and a forward end and a rear end,
an elongated, substantially planar top plate,
and a shank connecting one side edge portion of the top plate to the outer edge portion of the body plate,
the entire top plate being to the rear of the midpoint of a line joining the pivot portions,
the top plate being steeply inclined relative to said line and extending longitudinally rearwardly and inwardly relative to the body plate and lying in a plane tilted to a predetermined extent from the normal to the body plate,
the forward, outer end of the top plate comprising an arcuate abradable surface intersecting the forwardly and inwardly facing face of the top plate to form an acute cutting edge which extends laterally and rearwardly relative to the body plate from the end of the cutting edge nearer to the shank and lies substantially in a plane normal to the body plate,
the arcuate, abradable surface of the top plate being the outermost portion of the link and also intersecting the outer face of the top plate rearwardly of the cutting edge,
the arcuate abradable surface having as the center thereof, when the link is advanced by a drive sprocket of a chain saw, the axis of rotation of the sprocket.

3. The saw chain link of claim 2 wherein the top plate is inclined at an angle of between about 40° and about 50° relative to said line joining the pivot portions.

4. The saw chain link of claim 2 wherein the top plate extends laterally relative to the body plate at an angle between about 100° and about 115°.